INVENTORS
WILLIAM O. BENNETT, Jr.
WALTER A. FITZ MAURICE
WILLIAM W. MUTTER
BY
ATTORNEY

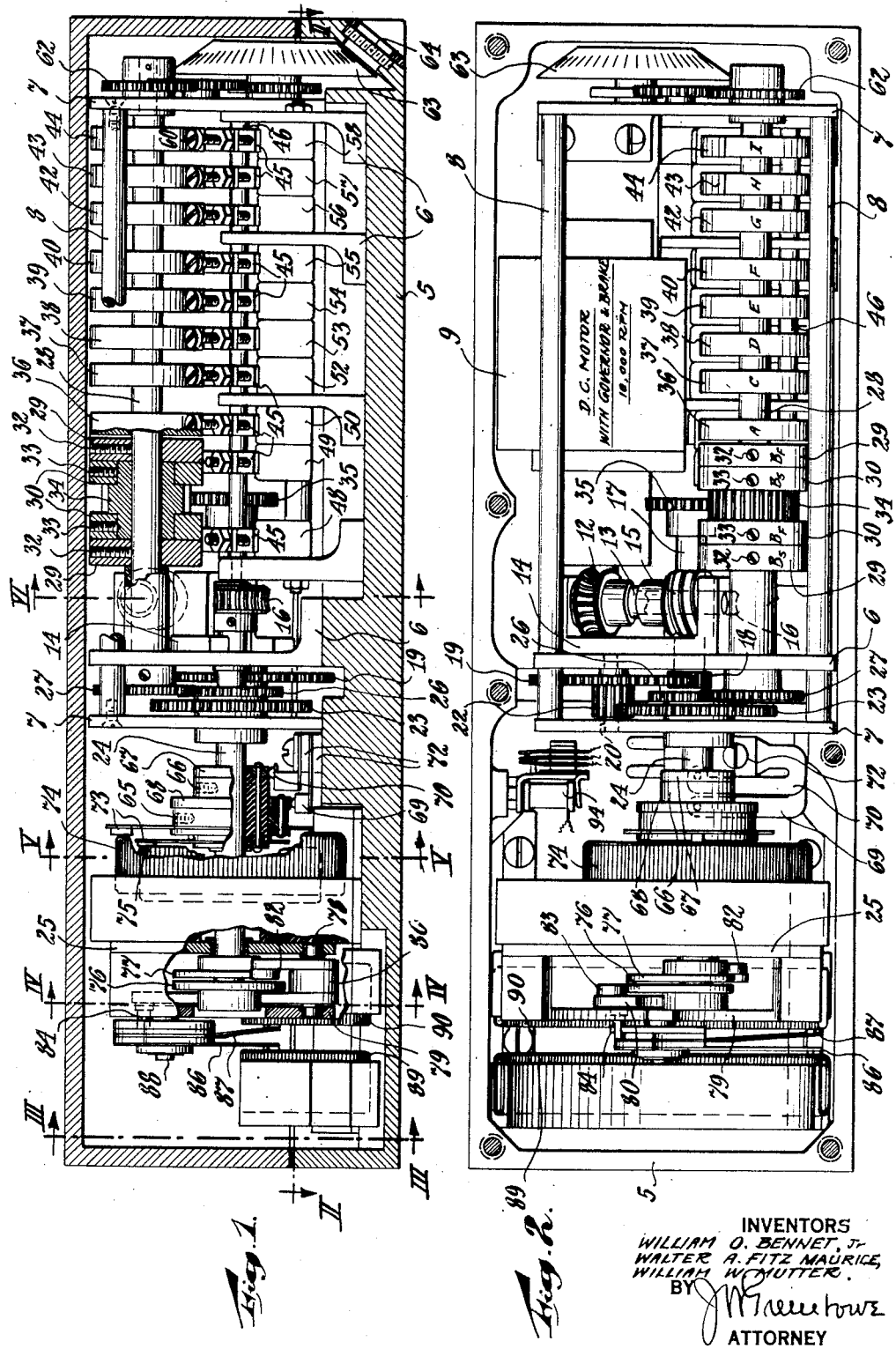

Feb. 18, 1958 W. O. BENNETT, JR., ET AL 2,824,198
PROGRAM TIMER
Filed May 22, 1953 4 Sheets-Sheet 3

INVENTORS
WILLIAM O. BENNET, JR.,
WALTER A. FITZ MAURICE,
WILLIAM W. MUTTER.
BY
ATTORNEY

INVENTORS
WILLIAM O. BENNETT, Jr.,
WALTER A. FITZ MAURICE,
WILLIAM W. MUTTER.
BY
ATTORNEY

United States Patent Office 2,824,198
Patented Feb. 18, 1958

2,824,198

PROGRAM TIMER

William O. Bennett, Jr., Bayside, N. Y., and Walter A. Fitz Maurice, New Milford, and William W. Mutter, Fair Lawn, N. J., assignors to Bulova Watch Company Inc., New York, N. Y., a corporation of New York Application May 22, 1953, Serial No. 356,668

2 Claims. (Cl. 201—48)

The present invention relates to timing devices and more particularly to timing devices which can be very precisely set to cause the initiation of a plurality of sequential operations at definite but exceedingly short intervals of time and wherein the total time of operation of the timing device itself is of short duration.

Timing devices of this general nature are of extreme importance for use in connection with the control of such apparatus as guided missiles and the like. In apparatus of this nature various mechanism is required to be operated in a preselected order and with each operation following the other after the lapse of an exceedingly definite time period. For example, once the timing device for such apparatus is set in operation it may be required to initiate as many as ten or twelve separate operations, with the lapse of only a few seconds between each initiation and the entire time of operation of the timing device being less than one minute.

Attempts have been heretofore made to design and manufacture a timing device of this nature but up to the present time they have not proven to be satisfactory. This has been due to the fact that they were not consistently dependable, since it was impossible to adjust them to give the precise exactitude of timing so essential for the desired operation under extreme environmental conditions, such as shock, vibration, temperature and voltage variations.

It is accordingly the primary object of the present invention to provide a timing device which performs a plurality of operations to initiate other operations in a preselected sequence and at a very definite and fixed instant of time while the entire time of operation of the accurate timing device itself is of short duration of the order of a minute or even less.

Another object of the present invention is the provision of an exceedingly accurate timing device which performs a plurality of sequential operations at precisely selected intervals of time and all within a total time of less than a minute's duration, and wherein such timing device is of a sturdy and dependable construction.

Another object of the present invention is the provision of a timing device that is readily adjustable to render it absolutely dependable to cause the initiation of a plurality of preselected operations at precisely accurate intervals of time and wherein the entire time of operation of the device itself is of only a relatively few seconds duration.

Another object of the present invention is the provision of a very accurately operable timing device in which a standard or uniformly wound potentiometer is operated by a unique mechanical movement to cause an irregular movement of the potentiometer arm so as to produce voltage varying non-linearly with time, which has heretofore been impossible except through employment of a potentiometer having a variation in spacing and pitch of its winding giving difficult, if not impossible, conditions for duplication of other individual potentiometers.

Another object of the present invention is the provision of mechanical arrangement that will cause a variable speed operation even though the driving member maintains a uniform speed of operation.

Still further objects of the present invention will become obvious to those skilled in the art by reference to the accompanying drawings wherein:

Fig. 1 is a side sectional view taken on the line I—I of Fig. 3 with parts thereof broken away to better illustrate the mechanism and showing a timing device constructed in accordance with the present invention;

Fig. 2 is a sectional view of the housing taken on the line II—II of Fig. 1 and showing the internal mechanism in top plan view;

Figure 3:
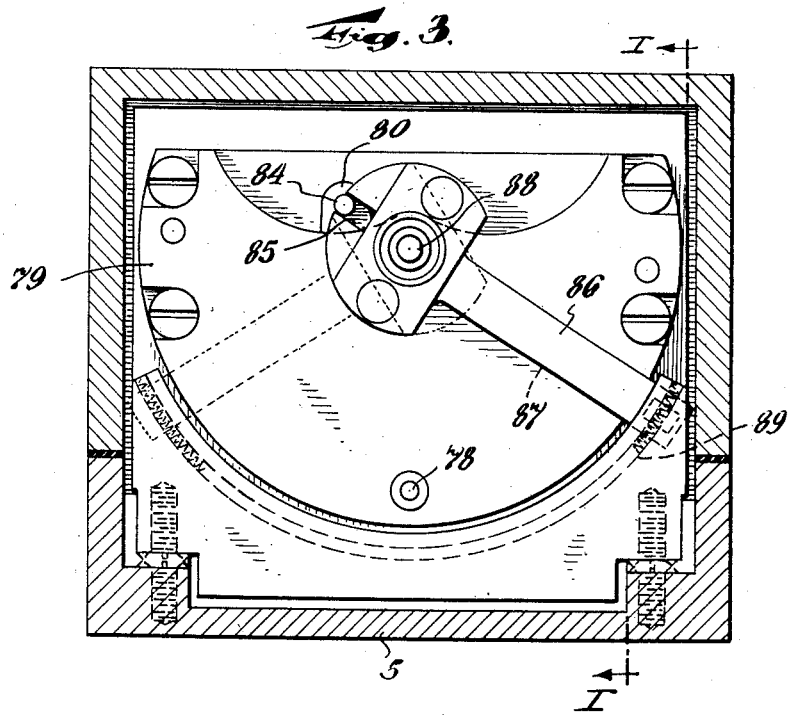
Fig. 3 is a sectional view take on the line III—III of Fig. 1.

Referring now to the drawings in detail the timing device of the present invention as therein shown comprises a housing 5 provided with a plurality of substantially L-shaped supports 6 as well as a pair of end plates 7 tied together by a pair of horizontal rods 8. A direct-current permanent magnet field motor 9, having a speed of about 10,000 R. P. M. and provided with a dynamic brake, is carried interiorly of the housing 5 and is provided with a worm 10 (Fig. 6) meshing with a worm wheel 12 carried by a short shaft 13 which is journalled to a U-shaped bracket 14 carried by one of the L-shaped supports 6. This short shaft 13 also carries a worm 15 engaging a worm gear 16 in turn secured to a further shaft 17. This shaft 17 carries at one end (left end as viewed from Fig. 2) a gear 18 meshing with a larger gear 19 affixed to a stub shaft 20 journalled between one of the L-shaped supports 6 and one of the end plates 7, as seen in Figs. 1 and 2. The stub shaft 20 in turn carries a small gear 22 engaging a larger gear 23 secured to a lower cam shaft 24 journalled in one end plate 7 and a further upright plate 25. Carried by this lower camshaft 24 is a gear 26 (Fig. 5) engaging another equal size gear 27 in turn carried by an upper camshaft 28. This upper camshaft 28 is journalled between one of the L-shaped supports 6 and end plate 7 and carries a pair of twin interconnected cams 29 and 30 so that the cams 29 make one revolution to each twenty revolutions of the cams 30. Such results from the fact that the cams 29 are fastened to the shaft 28 by set screws 32 while the cams 30 are secured by set screws 33 to a freely rotating gear 34 on the shaft 28 but with such gear 34 engaging a gear 35 secured to the opposite end (from gear 18) of the shaft 17. Due to the respective ratios of the gears as above mentioned this causes the cams 29 to rotate but once each cycle of forty-five seconds to each twenty revolutions of the cams 30 during this same cycle. Also carried by the upper camshaft 28 and thus rotating but once each cycle are a plurality of cams 36, 37, 38, 39, 40, 42, 43 and 44 each one of which, along with the twin cams 29 and 30, is arranged during their respective rotation to engage a substantially U-shaped adjustable rocker arm or follower 45 (Fig. 6)

with all of such rocker arms being journalled upon a stationary shaft 46 supported by the L-shaped supports 6.

Figure 6:
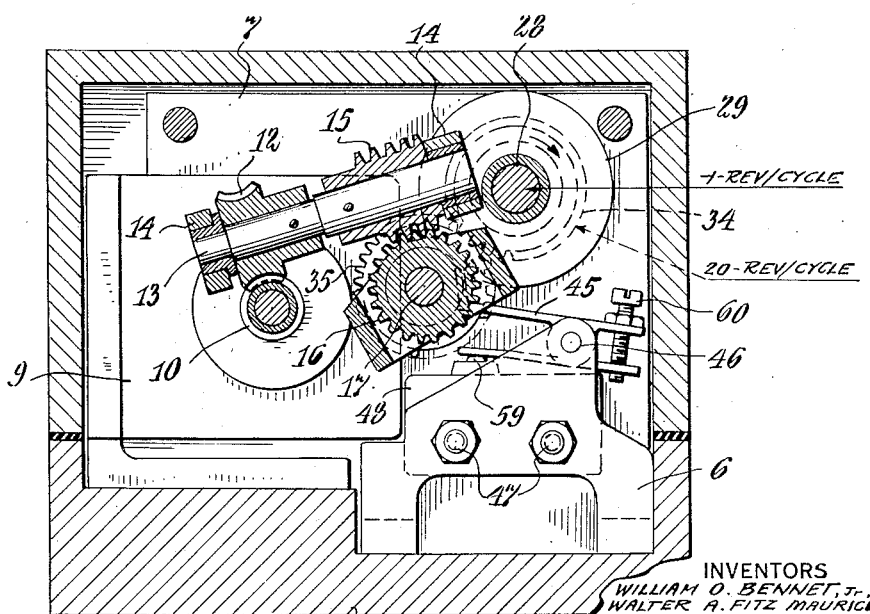
Fig. 6 is a sectional view taken on the line VI—VI of Fig. 1.
Figure 7:
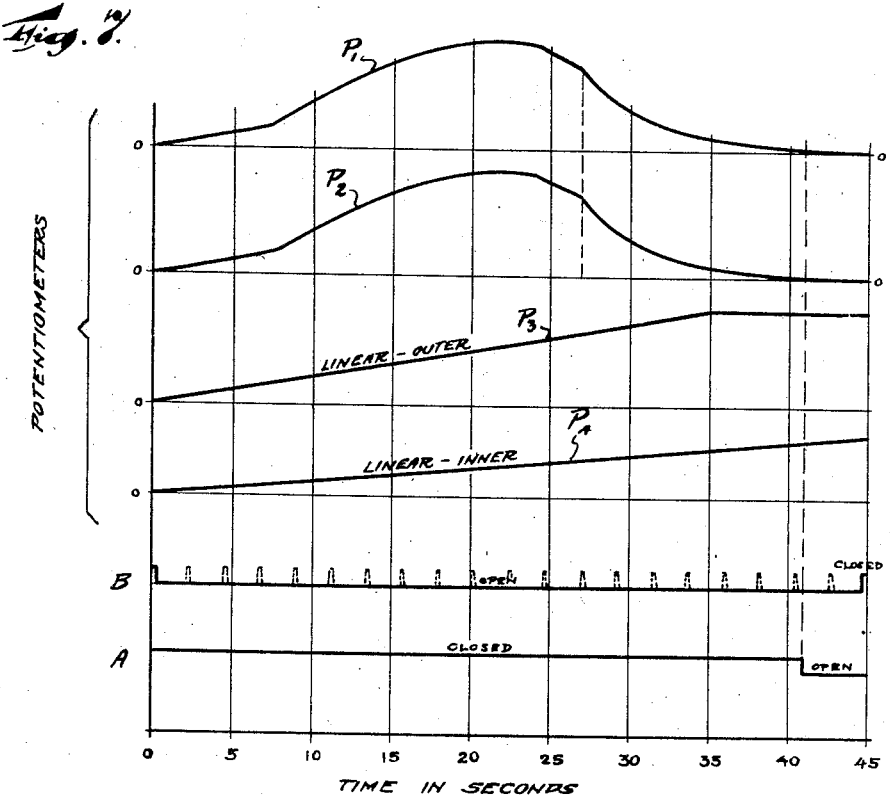
Fig. 7 is a graphic illustration of the operation of certain parts of the timing device of the present invention at certain precise periods of time.

Disposed in a horizontal plane and secured adjacent each other by a pair of rods 47 extending through and supported by the L-shaped supports 6, are a plurality of miniature snap-action switches 48, 49, 50, 52, 53, 54, 55, 56, 57 and 58. As can be seen more readily from Fig. 6 the lower end of the U-shaped rocker arms are so positioned as to depress the button 59 on each of the respective adjacent snap-action switches with the actuation being adjusted by the individual set-screws 60. The cams carried by the shaft 28 are so adjusted as to engage the rocker arms 45 and cause either closure or opening of the respective snap-switches in a preselected manner, some of which are shown in Fig. 7, and as will be hereinafter more fully explained.

It will be noted that the end of the shaft 28 (right hand end as viewed from Figs. 1 and 2) carries a gear 62 which through a gear train rotates a graduated dial 63 that can be viewed through a window 64 provided in the enclosing housing 5. In this manner an observer can check the operation of the timing device since the dial 63 being driven by the same gear ratio as that which drives the upper cam-shaft 28, also makes one complete revolution each cycle of operation of the timing device and the correct position of the dial can be thus observed at any given moment during such cycle.

Figure 5:
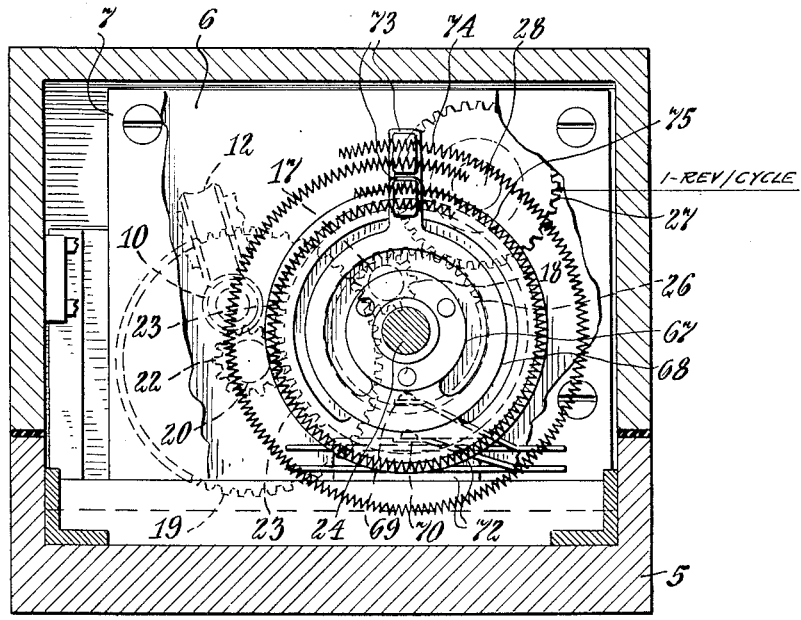
Fig. 5 is a sectional view taken on the line V—V of Fig. 1.

Returning now to the shaft 24 it will be seen from Figs. 1 and 2 that it is provided with a pair of insulated drums 65 and 66 each of which carries a collector ring 67 and 68 on its face (Fig. 5) and electrical contact is established with such collector ring by separate brushes 69 and 70 secured to insulated supports 72 carried by the base of the timing device as clearly shown in Figs. 1, 2 and 5. Each of the collector rings 67 and 68 is provided with a wiping contactor 73 with such contactor of the ring 68 bearing against the outer linear resistance winding 74, while the contactor of the collector ring 67 bears against the inner linear resistance winding 75. It can thus be seen that the linear resistance windings 74 and 75, together with their respective wiper arms 73, form an inner and outer positioned linear potentiometer.

Figure 4:
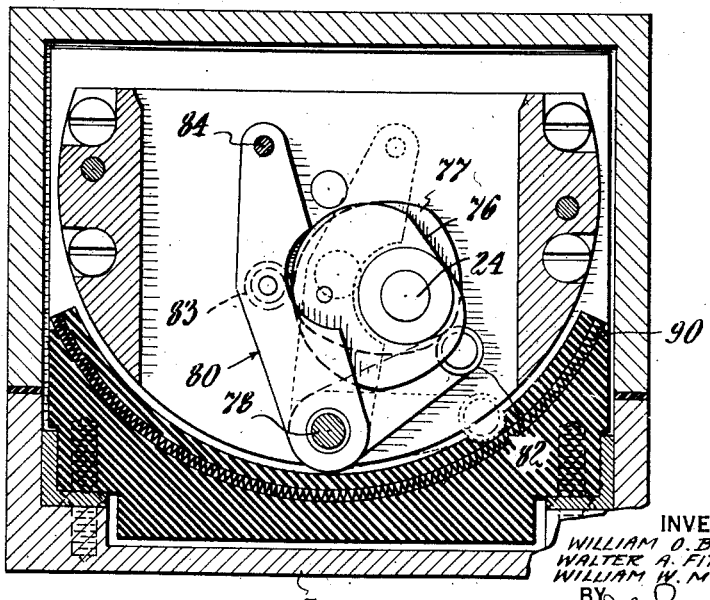
Fig. 4 is a sectional view taken on the line IV—IV of Fig. 1.

The extreme outer end (left as viewed from Figs. 1 and 2) of the shaft 24 carries a pair of cams 76 and 77. Journalled for pivotal movement about an axis 78, between the plate 25 and a further plate 79, is a substantially L-shaped member 80 (Fig. 4), the shortest arm of which carries a follower 82 engaging the cam 77 and similarly the longer arm also carries a follower 83 engaging the other cam 76. The upper end (as viewed from Fig. 4) of the longer arm of the L-shaped member 82 is provided with a projecting pin 84 passing through a slot 85 which drives a pair of wiping arms 86 and 87 pivotally connected at 88 to the plate 79. These wiping arms 86 and 87 are individually adjustable and insulated from the shaft 88 and each other and are arcuately movable contactors engageable with a pair of arcuately disposed linear resistance winding 89 and 90, respectively, which arms 86 and 87 together with the resistance windings 89 and 90, form linear potentiometers.

Figure 8:
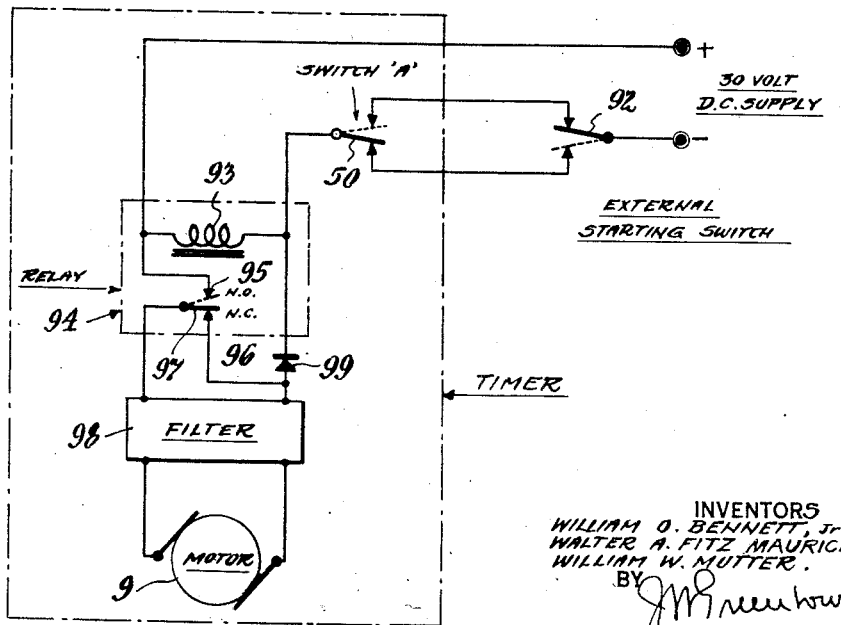
Fig. 8 is a schematic diagram of the energizing circuit together with the dynamic brake for the operating motor.

Referring now more specifically to Fig. 8, it will be noted that the operating motor 9, having permanent magnets for producing its electrical field, is arranged to be connected to a D. C. source of supply of about 30 volts, as indicated by the legend in Fig. 8, upon closure of an external switch 92. This latter switch 92, together with the cam-operated miniature snap-switch 50, form what is commonly referred to as a three-way or "lazy-man" arrangment, which enables the motor 9 to be started and stopped by either the external switch 92 or the snap-switch 50. Assuming these switches are in the position as shown by the full lines in Fig. 8 it will be noted that current of a positive polarity will be supplied to one end of the winding 93 of a relay 94 and to a normally open contact 95 of this relay, while the normally closed contact 96 of such relay which is engaged by the relay armature 97 forms a short-circuit across the motor 9 through a filter arrangement 98.

Current of a negative polarity from the 30 volt source of supply is prevented from flowing at the moment because of the interruption in the circuit by the switches 92 and 50. If, now, the switch 92 is moved to the position shown in dotted lines in Fig. 8, the circuit is then completed, enabling current to now flow through relay winding 93, switch 50 (which is assumed to be in the full line position shown in Fig. 8), and switch 92 (now assumed to be closed in its dotted line position) back to the negative side of the source of supply. Relay winding 93 being energized immediately attracts its armature 97 away from normally closed contact 96 and into engagement with normally open contact 95. Engagement of these two thus completes a circuit to the timer motor 9, through the filter 98 and a small selenium rectifier 99 with motor 9 continuing to operate until the energizing circuit is again interrupted by opening of the miniature snap-switch 50 by rotation of cam 36, to its dotted line position as shown in Fig. 8.

At the instant that snap-switch 50 opens, the winding 93 of relay 95 is of course disconnected from the 30 volt D. C. supply source, but in the absence of rectifier 99, the motor 9 would continue to rotate because its permanent magnets, which supply an internal field, cause the motor 9 to immediately become a generator, which would supply sufficient current to relay winding 93 to cause it to retain its armature 97 in engagement with contact 95 for a substantial period of time after interruption of the actual energizing circuit for the motor by snap-switch 50 with accompanying rotation of the motor 9 and the various cams. However, since current can flow through rectifier 99 in only one direction, such is permitted only during connection of the motor 9 to the D. C. supply source and when snap-switch 50 opens and motor 9 is no longer supplied with current from the source, the current produced by the motor 9 functioning as a D. C. generator cannot flow through rectifier 99 to thus retain relay winding 93 energized. Accordingly, as soon as snap-switch 50 opens, relay 94 is immediately deenergized causing its armature 97 to again engage normally closed contact 96, thus reestablishing the short-circuit across the motor 9 and producing a dynamic brake which immediately stops further rotation of the motor 9. Thus the cam 36 which operates snap-switch 50 allows two distinct operating times with the longer period being known as the "cycle" time and encompasses all operations whereas the shorter "recycle" time resets all operations.

The timing device of the present invention operates as follows: the electric motor 9, which, as noted, rotates at 10,000 R. P. M. is first energized by closure of external switch 92, as above explained. Rotation of the motor 9 will cause rotation of the lower camshaft 24 through the gear train previously enumerated so that the cams 76 and 77 carried by the shaft 24 are likewise rotated. Since these cams 76 and 77 engage the respective followers 82 and 83 carried by the L-shaped member 80, this member is caused to pivot about its axis 78 at a variable speed. In other words because of the shape of the cams 76 and 77 and the fact that they both influence movement of the member 80 by engaging different arms thereof, the speed of rotation and hence the arcuate movement of the projecting pin 84 varies in speed. The two cams 76 and 77 thus provide such action that the L-shaped member 80 is positively driven at all times and no spring loading of the followers 82 and 83 is necessary thus making a positively operable variable speed mechanism driven from a constant speed. Inasmuch as pin 84 passes through the slot 85 of the assembly carrying wiper arms 86 and 87 the pin will cause these wiper arms to pivot about their axis 88 with their outer end contactor passing at a variable speed over the uniformly spaced windings of the arcuate shaped linear resistance windings forming the potentiometers 89 and 90, until the potentiometer wiper arms 86 and 87 have caused their respective end contactors to travel the full length of the arc and back again to their starting point.

This may be better appreciated by reference to Fig. 7 wherein the curve $P_1$ indicates a voltage curve of a circuit in which the potentiometer winding 89 is included. At starting of the motor 9, the voltage of the circuit including the potentiometer winding 89 is shown as zero then such voltage rises linearly for about seven or eight seconds due to the shape of cams 76 and 77 after which these cams cause the voltage to rise much more rapidly and non-linearly by increasing the speed of movement of the wiper arms 86 and 87 until a peak is reached after about twenty-two seconds when the voltage again starts to decrease linearly for a brief period of about three seconds (after an operating time of from about twenty-five to twenty-seven seconds) after which the voltage drops off more rapidly following the curve as shown, until the arm 86 has completed its outward and return arcuate movement when the voltage in the controlled circuit will again drop to zero.

The curve $P_2$ of Fig. 7 represents the voltage curve in still another controlled circuit and as noted is identical to the curve $P_1$ since it is caused by the action of the cams 76 and 77 in driving the wiper arm 87 over the potentiometer winding 90 in an outward and return arcuate movement in the same manner as just described relative to the movement of the wiper arm 86. At the same instant the shaft 24 rotates the insulated drums 65 and 66 and with them the wiper contacts 73 of the respective collector rings 67 and 68 which engage the potentiometer windings 74 and 75. Since this is a straight rotary motion the curves $P_3$ and $P_4$ represent a linear variation in the voltage supplied to the separate circuits in which the potentiometer windings 74 and 75 are included.

It will of course be appreciated that the above non-linear curves $P_1$ and $P_2$ are illustrative only, as any other modified curve form can be readily obtained, merely by varying the cams to give the desired shape of non-linear curve.

Simultaneously with initial rotation of the lower camshaft 24 the upper camshaft 28 is likewise rotated which thus rotates the cams 29—30, 36, 37, 38, 39, 40, 42, 43 and 44 one complete revolution during the entire operating time of the timing device, which in the present embodiment as shown is one cycle of forty-five seconds, although such "cycle" can be made for any desired period of operation. Rotation of cam 36 one complete revolution operates snap-switch 50 to stop the timer at the completion of its cycle of operation, as above explained and as illustrated by the line "A" in Fig. 7. However, prior to such operation of snap-switch 50, the remaining above mentioned cams 37 to 44, inclusive, will have operated during their respective single revolutions to open or close the additional miniature snap-switches 52 to 58 as desired for the specific operation for which the timing device is designed.

The operation of the cams 29—30 on the snap-switches 48 and 49 as hereinbefore mentioned gives extreme accuracy. To achieve this accuracy the timing, or operation of the snap-switches 48 and 49, occurs upon the drops in the cams 29—30 rather than on the rises thereof. Moreover, the two snap-switches 48 and 49 are connected electrically in series in the circuit they are to control with one of these switches (48) being normally open while the other (49) is normally closed. Each switch, however, as previously explained, is operated by a single rocker arm 45 which in turn is moved about its pivot only when the drop in the respective cams 29—30 coincide.

For example, when the two cams 29—30 are approaching coincidental position the slow cam 29 first clears the follower or rocker arm 45, and then immediately the fast cam 30 will clear this particular follower 45 allowing its cam engaging end to drop thus moving the rocker arm about its pivot and closing normally open snap-switch 50 and since series connected snap-switch 49 is in series the control circuit is accordingly closed at an extremely accurate preselected instant. To open this circuit the same operation occurs with respect to the other slow and fast rotating cams 29—30 of the pair for when their drops coincide their respective follower 45 will drop its cam engaging end and move the rocker arm about its pivot to cause opening of normally closed snap-switch 49 to thus open the circuit at an exceedingly accurate preselected instant. Such action is depicted by the line "B" of Fig. 7 with the dotted peaks representing coincidence of the fast cams 30 with their respective followers 45 without operation of either of the switches 48 or 49 until there is complete coincidence of the two cams 29—30 of each pair. Such coincident cam arrangement accordingly enables the timing to be held to within 0.01 to 0.02 second simply by spacing of the cam surfaces 29 and 30 with respect to each other.

It will thus be seen from the foregoing that a timing device of extremely precise accuracy is provided by the present invention which, once preset to initiate a plurality of operations at definite intervals of time, will perform its operation with unwavering fidelity even though the entire period of operation of the device is relatively short, being of the order of a minute or less. Moreover, a unique mechanical arrangement is provided whereby a variable speed is applied to the movement of potentiometer arms so as to cause a non-linear voltage curve in connection with the circuit including such potentiometers and by providing cams of widely different speeds which must be substantially aligned before causing a definite desired operation, a fine degree of timing adjustment is achieved. Also it will be appreciated that the variable speed of movement of the potentiometer arms enables linear resistance windings to be readily used with accurately producible results which would be difficult, if not impossible, to accurately reproduce with non-linear resistance windings.

Although one embodiment of the present invention has been shown and described it is to be understood that other modifications thereof may be made without departing from the spirit and scope of the appended claims.

What is claimed is:

1. A timing device for initiating a plurality of operations at precise instants of time, comprising a base member, a controlled speed source of motive power carried by said base, a camshaft carried by said base and provided with a pair of cams thereon and rotatable by said motive power, a pivoted member engaging both of said cams and positively driven thereby at a variable speed in both directions about its pivot by rotation of said cams, a potentiometer carried by said base and having its winding arcuately disposed relative to the axis of rotation of said camshaft, and a wiping arm connected to said pivoted member and movable by the latter during its variable speed movement outwardly and back over said arcuately disposed potentiometer winding to cause a variable voltage curve in the electrical circuits in which the potentiometer is included.

2. A timing device for initiating a plurality of operations at precise instants of time comprising a base member, a high speed source of motive power carried by said base, a camshaft carried by said base and provided with a pair of cams thereon and rotatable by said motive power, a pivoted member engaging both of said cams and positively driven thereby at a variable speed in both directions about its pivot by rotation of said cams, a potentiometer carried by said base and having a substantially uniformly spaced winding, a wiping arm connected to said pivoted member and movable by the latter during its variable speed movement outwardly and back over said uniform potentiometer winding to cause a non-linear voltage curve in the electrical circuits in which the potentiometer is included.

References Cited in the file of this patent

UNITED STATES PATENTS

| | | | |
|---|---|---|---|
| 2,099,971 | Dailey | | Nov. 23, 1937 |
| 2,144,965 | Fairchild | | Jan. 24, 1939 |
| 2,158,654 | Dorsett | | May 16, 1939 |
| 2,431,749 | Grant | | Dec. 2, 1947 |
| 2,630,171 | Allgaier | | Mar. 3, 1953 |